United States Patent

[11] 3,599,873

[72] Inventor Norman A. Williams
Stafford Springs, Conn.
[21] Appl. No. 857,976
[22] Filed Sept. 15, 1969
[45] Patented Aug. 17, 1971
[73] Assignee United Aircraft Corporation
East Hartford, Conn.

[54] VARIABLE AREA EXHAUST NOZZLE CONSTRUCTION
2 Claims, 1 Drawing Fig.
[52] U.S. Cl.................................................. 239/265.39
[51] Int. Cl.......................................................... B64c 9/38
[50] Field of Search............................................239/265.33,
265.37, 265.39, 265.41

[56] References Cited
UNITED STATES PATENTS
3,044,258  7/1962  Carlton et al.................  239/265.33
3,048,973  8/1962  Benedict......................  239/265.39 X
3,519,207  7/1970  Clough..........................  239/265.33 X
FOREIGN PATENTS
1,071,851  9/1954  France..........................  239/265.33

Primary Examiner—M. Henson Wood, Jr.
Assistant Examiner—Michael Y. Mar
Attorney—Jack N. McCarthy ABSTRACT: A variable area exhaust nozzle for a gas turbine engine, in particular, an iris-type flap nozzle for use with a gas turbine engine, wherein the flap tips of the iris nozzle are preloaded compressively to prevent and avoid any subsequent area changes in the exhaust nozzle.

This application is reported as a Subject Invention under Government contract F-33657-67-C-1402.

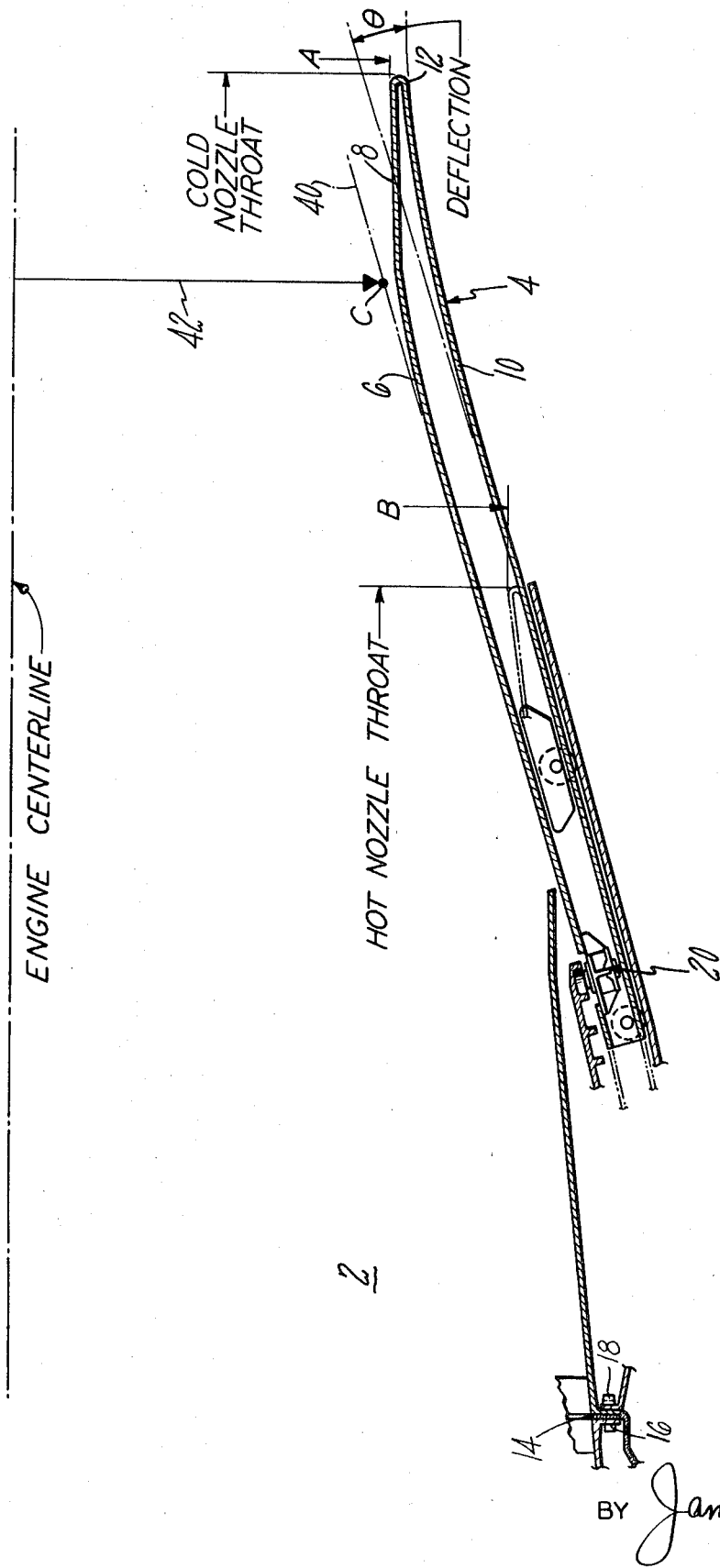

VARIABLE AREA EXHAUST NOZZLE CONSTRUCTION

BACKGROUND OF THE INVENTION

This invention relates to a variable area nozzle construction and, more particularly, to an iris-type flap nozzle adapted for use with a gas turbine engine.

It has been generally recognized by those skilled in the gas turbine engine art that the operating characteristics of jet propulsion engines may be improved by the use of an exhaust nozzle which is capable of having its exhaust area varied. Typical nozzle constructions of a variable area type are contained in the prior art constructions disclosed in U.S. Pat. Nos. 2,699,645, 2,770,944 and 2,974,480. However, a major disadvantage with these prior art constructions is that the flap tips of the nozzles deflect and result in a subsequent area change of the exhaust nozzle, adversely or causing a performance degradation in the engine.

One method of avoiding the deflection of the flap tips and the adverse area changes, would be to use a much stronger and heavier flap tip design. However, the disadvantage with this would be that the resulting nozzle construction would be extremely heavy. This resultant heaviness would be a penalty upon the overall engine performance and hence would be unacceptable as a compromise.

SUMMARY OF THE INVENTION

It is a primary object of this invention to provide a variable exhaust nozzle of the iris type, which is of a lightweight construction and which is capable of maintaining a fixed nozzle exhaust area with substantially no change in area over a predetermined engine operating range.

The present invention accomplishes the foregoing object by providing a flap construction wherein the flap tips provide a compressive ring to prevent any nozzle exit area changes. The flap construction and its associated support structure are arranged such that the flaps are aimed at a predetermined point along the line of travel of the flaps, this predetermined point being at a radius less than that required for the desired nozzle area. More specifically, once it is determined what the desired nozzle area is to be for the exhaust nozzle construction, a predetermined point, which is simultaneously the aiming point and an interference point between each adjacent flap, is selected. This interference or predetermined point is arrived at as the intersection of the line of travel of the flaps and the correct nozzle area with its concomitant radius. More specifically, a known or desired exhaust nozzle area is determined and knowing this radius, a predetermined point or aiming point is determined as a function of the extension of the flaps. Therefore, knowing the radius desired and the line of travel, an interference point can be arrived at which will provide the desired nozzle area. Further extension of the flaps after the aiming point or predetermined point has been reached to the fully extended position of the flaps, will cause the flap to bend outwardly, and cause the formation of a stiff compressive ring by the flap tips. In other words, the flap tips become preloaded, and the torsional stiffness of the flaps is great enough so that any two flaps will preload each other and is great enough to assure stability of the compressive ring. Therefore, as internal pressure is applied to the nozzle flaps, compressive loads in the ring will be relieved with very small radial deflection, and flap bending will also be relieved. It should be clear to those skilled in the art that the construction of the present invention eliminates large flap tip deflection and subsequent area nozzle changes with a subsequent maintenance of performance over an entire operating regime.

BRIEF DESCRIPTION OF THE DRAWING

FIG. 1 is a fragmentary sectional view showing a portion of a variable area nozzle and the device of the invention in both its translated and untranslated positions.

DESCRIPTION OF THE PREFERRED EMBODIMENT

Referring to FIG. 1, the aft end of a gas turbine engine is illustrated. Although the details of the engine are not shown, the engine is of a conventional design in which ambient air is drawn into a compressor and delivered in a compressed fashion to a burner section where heat is added, the air being delivered to a turbine section where work is extracted and then discharged through primary exhaust nozzles.

Primary exhaust nozzle 2 is of the variable area type, and in the present embodiment illustrated is a nozzle that is commonly called an iris type. Nozzle 2 includes flaps 4 which are movable axially and radially inwardly and outwardly, thereby affecting the desired area change. During operation of the engine in normal horizontal flight, the position of variable area exhaust nozzle 2 is controlled or regulated in accordance with engine parameters to provide a programmed exhaust nozzle area as a function of selected engine parameters.

As illustrated in the present embodiment, the nozzle 2 is an iris air motor powered, variable area, convergent-divergent nozzle. It includes a plurality of flaps 4, the flaps 4 and inner flap seals (not shown) comprise the nozzle contour over the range of exit area settings. Each flap 4 consists of an inner surface 6 stiffened by a honeycomb structure 8 and a hat section 10 of the outer section 12 extending the length of the flap. The outer surface 12 of each flap 4 has a labyrinth strip over the top of the hat section to create a smooth aerodynamic surface. The basic nozzle flap 4, as herein described, is a stress limited box-type structure, and the maximum loading occurs under conditions of sea level augmenter flameout. Nozzle flaps 4 are assembled so that in the minimum jet area position, indicated by the letter A on FIG. 1, they are preloaded in a compressive hoop load at the tips. This compressive hoop load which causes the flap tips to act like a ring structure will be hereinafter described in greater detail. However, when operating, the compressor preload is relieved by the pressure load on the flap 4 with essentially no change in nozzle area. The maximum tip area is indicated by the letter B on FIG. 1.

Iris nozzle 2 may be attached to an engine flange 14 by any conventional securing means, herein illustrated as a plurality of bolts and nuts 16 and 18 respectively. At the forward end or upstream end of each flap, are the actuating means 20 herein illustrated as a roller for translating the flaps inwardly and outwardly.

Again referring to FIG. 1, flap 4 is illustrated as passing through three different positions: the minimum tip area as designated by reference character A; the maximum tip area as designated by reference character B; and an intermediate area designated by reference character C. This intermediate position is of significance because, as herein illustrated, this is the predetermined interference point. More specially, flaps 4 travel along a path illustrated by line 40, and at some point along the line of travel 40, the point being determined as a function of the radius of the desired exhaust or exit area, and the intersection of this radius with the line of travel 40, each of the adjacent flaps interfere with one another. As shown on FIG. 1, radius 42, as measured from the engine centerline, intersects the line of travel 40 at point C.

Once the flaps reach the predetermined interference point, further axial extension or movement causes flaps 4 to deflect radially outward relative to line of travel 40. As a result of this further extension and the outward deflection of the flaps 4, the flaps actually curving or arcing over their entire length, while forming a stiff compressive hoop ring at the flap tips. This compressive ring at the full axial extension position prevents any outward or inward deflection of the flaps which would normally result from internal or external pressure loading. Therefore, the exhaust area remains substantially constant from the point of interference to the fully extended nozzle position.

It has been determined that the most optimum predetermined point of interference occurs at approximately 80 to 90 percent of the travel of the flaps. More specifically, once a desired or required area for a particular application is determined, the radius is thereby determined. Utilizing this radius and the line of travel of the flaps, the interference pint can be determined. Preferably it should be at a point where the flaps have been extended to within 80 to 90 percent of their full extension.

As has been hereinbefore described, further extension of the flaps past the interference point does not change the exhaust area substantially. This substantially constant area results principally from the fact that the flaps deflect radially outward, as indicated by the angle $\theta$, rather than continuing radially inward along their line of travel 40.

I claim:

1. A convergent nozzle having a plurality of nozzle flaps which are translatable in a radial and axial direction, the extension and retraction of the flaps varying the exhaust area of the nozzle, and apparatus for extending and retracting the nozzle flaps wherein the improvement comprises;

the flap tips forming a compressive ring, at least in their fully extended position, the compressive ring being formed by causing each of the flaps to interfere with one another at some predetermined point prior to the flap tips reaching their fully extended position;

the predetermined point of interference of the flaps is the intersection of the line of travel of the flaps, and a radius of the desired exhaust nozzle area;

extension of the flaps after the interference point causes the tips of the flaps to bend outwardly, the flap tip radius at the point of interference remaining substantially constant from point of interference to the fully extended position.

2. In combination an iris-type nozzle for a gas turbine engine, the nozzle including a plurality of nozzle flaps which are movable in a radial and axial direction so as to vary the exhaust area of the nozzle, and means for actuating the nozzle flaps wherein the improvement comprises;

each adjacent flap interferes with the next adjacent flap at a predetermined point, this predetermined point being at least prior to the fully extended position of the flaps;

the predetermined point of interference of the flaps is the intersection of the line of travel of the flaps, and a radius of the desired exhaust nozzle area;

extension of the flaps after the interference point causes the tips of the flaps to bend outwardly, the flap tip radius at the point of interference remaining substantially constant from point of interference to the fully extended position.